Feb. 27, 1968 S. KASAKOFF 3,370,524
HIGH-SPEED COFFEE BREWER
Filed Aug. 5, 1966
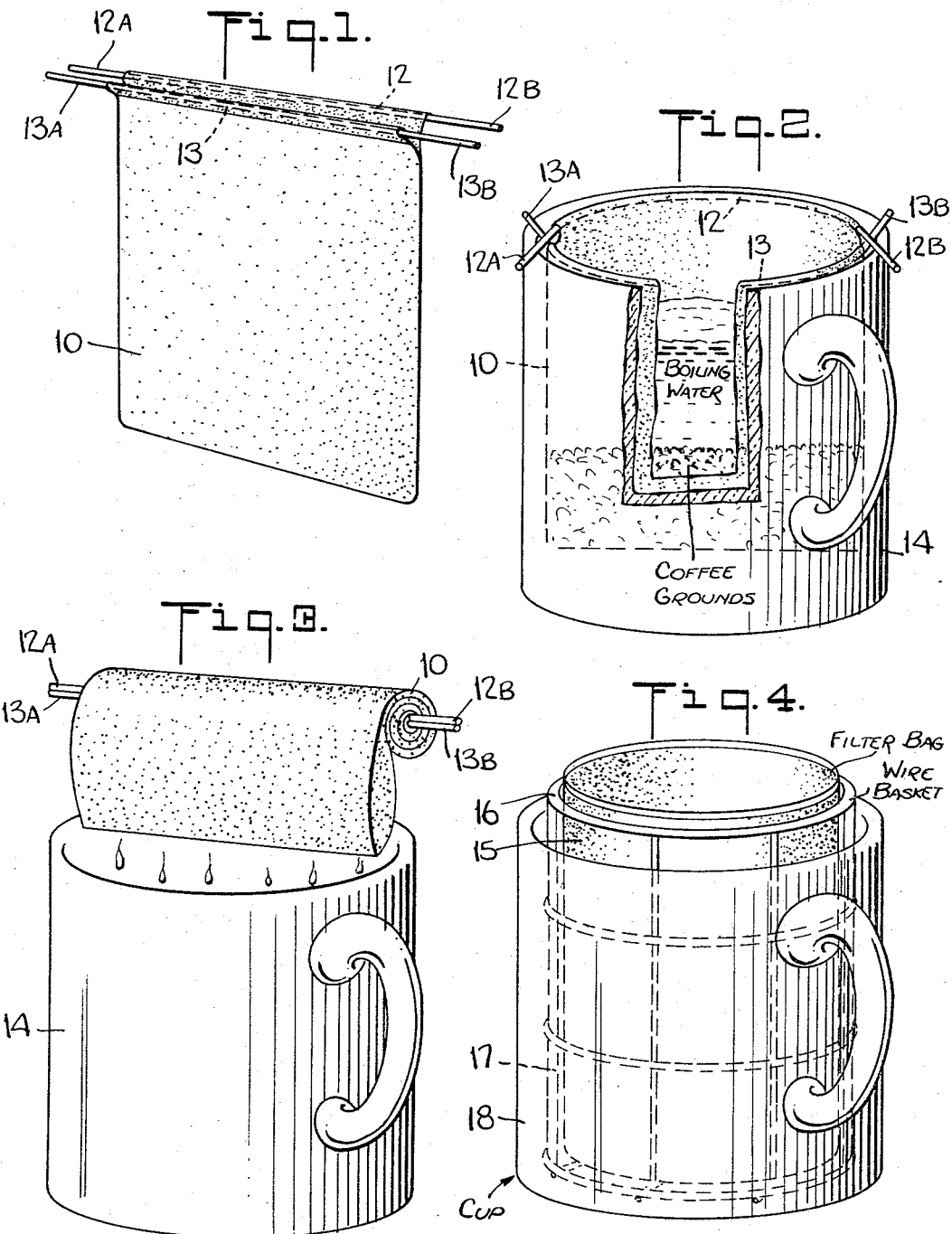
INVENTOR.
SAM KASAKOFF
BY
ATTORNEY United States Patent Office 3,370,524
Patented Feb. 27, 1968

3,370,524
HIGH-SPEED COFFEE BREWER
Sam Kasakoff, 329 E. 58th St., New York, N.Y. 10022
Filed Aug. 5, 1966, Ser. No. 570,557
7 Claims. (Cl. 99—287)

ABSTRACT OF THE DISCLOSURE

A coffee maker capable of brewing coffee within a container without leaving a deposit of spent coffee grounds, the maker being constituted by an openable filter bag formed of liquid-permeable material for holding a measure of coffee grounds, which bag is receivable within the container, boiling water being poured into the open bag over the grounds to effect a brewing action, means being provided to close the bag to envelop the boiling water and to thereafter subject the closed bag to pressure to express the boiling water through the filter material into the container.

---

This invention relates generally to coffee makers, and more particularly to an improved coffee maker, which includes a filter and which efficiently and in a matter of seconds, brews ground coffee to produce a beverage of high strength and quality.

Coffee beans must be carefully roasted before they are ready for the consumer. Roasted coffee contains about 1% to 2% of the alkaloid, caffein, which acts as a cerebral stimulant. While coffee contains glucose, dextrin and protein, its aroma is due primarily to an oily substance, known as caffeol, which quickly oxidizes when exposed to air. It is for this reason that modern vacuum packaging techniques are used to preserve the flavor and aroma of coffee.

Various techniques are currently used to brew coffee. The simplest is the so-called pot method, wherein the ground coffee is deposited in a pot of boiling water which is allowed to steep until a liquid of the proper concentration is produced. The drawback to this method is that one must wait until the essences are extracted and the coffee grounds settle, otherwise the grounds and the liquid are intermingled and the beverage is bitter and unpleasant to the taste. On the other hand, since the grounds remain in the liquid, a point is reached where the coffee concentration is excessive and oils are boiled out, thereby producing a disagreeable flavor. Thus the quality of pot coffee is difficult to control.

In the drip method, boiling water is poured over the coffee grounds in a double container and the resultant beverage trickles through pores in the upper container to flow into the lower container. While this method produces coffee of good quality, it is cumbersome and slow. The well-known percolator method is somewhat slower and since in this technique the boiling beverage is recirculated through the coffee grounds, the aromatic oils are volatilized and the resultant beverage is relatively insipid.

The filter method is similar to the drip method except that the coffee grounds are deposited in a funnel-shaped paper filter which is permeably only to the beverage. This method is also very slow, for the coffee grounds tend to clog the pores of the filter and no pressure exists to accelerate the slow trickle of the beverage through the filter. Nevertheless, this method has attained some degree of success in that the resultant coffee is of excellent quality.

It is important to bear in mind that when brewing with continuously boiling water, live steam or recirculating hot water, the aromatic oils are volatilized and the coffee is rendered flat. But when brewing with water brought to the point of boiling, the coffee is of far better quality but the brewing process is ordinarily much slower. Hence existing brewing techniques which are slow produce superior coffee and those which are fast product an inferior beverage. The fastest way to make coffee is by using coffee powder, but such so-called instant coffee is of very poor quality in that when converting a brewed liquid coffee into crystalline powder for later use with heated water, most of the aromatic constituents are lost.

Accordingly, it is the main object of this invention to provide a coffee maker which quickly and efficiently produces a highly aromatic coffee beverage of high strength and of superior quality. A significant feature of the invention rests in the fact that the brewing process is accelerated without a concomitant loss of quality.

More specifically, it is an object of the invention to provide a coffee maker incorporating a filter bag, which is capable of brewing a beverage of exceptionally good quality in virtually the same amount of time it takes to make instant coffee. Another advantage of the invention is that it is possible by the choice of filter bags, to brew even a single cup of coffee, although one may choose to brew much larger quantities.

As noted above, the reason why previous filter techniques were slow is because of the absence of pressure, as a consequence of which the seepage of liquid through the filter medium is gradual and becomes progressively slower as the filter clogs. But with the present invention, the liquid flowing through the filter bag is subjected to pressure which accelerates the extraction of coffee essences from the grounds held in the filter bag.

Briefly stated, in one preferred embodiment these objects are accomplished by a filter bag formed of filter paper or other material permeable to liquid, the pores of the bag being sufficiently minute to entrap coffee grounds held in the bag. Wires or other deformable means are secured to the mouth of the bag, whereby the mouth may selectively be opened or sealed by deformation of the wires. The wires are provided with lateral extensions which are adapted to rest on the rim of a cup or other container to suspend the filter bag therein.

In the brewing operation, a standard measure of coffee grounds is added to the bag and boiling water is poured thereover, the water extracting the essences from the grounds and seeping through the filter bag into the cup. To accelerate brewing and to subject the liquid to pressure, the wires are pulled by their extension to seal the bag, the wires then being rotated to wind the bag into a roll and thereby to express the liquid from the filter.

For a better understanding of the invention, as well as other objects and further features thereof, reference is made to the following detailed description to be read in conjunction with the accompanying drawing, wherein:

FIG. 1 shows a preferred embodiment of a collapsed filter bag in accordance with the invention;

FIG. 2 illustrates in perspective an expanded filter bag with a cup in a position to brew coffee;

FIG. 3 shows how pressure is applied to the liquid within the filter bag to accelerate the brewing process; and FIG. 4 shows another embodiment of the invention.

Referring now to the drawing, and more particularly to FIG. 1, there is shown a filter bag in accordance with my invention, the bag being in the form of a flat rectangular envelope 10 having an open end or mouth 11. The bag is preferably formed of filter paper, or cellulosic material having high wet strength and permeable to liquid, the pores of the filter medium being sufficiently minute to prevent the coffee grounds held in the bag from discharging therefrom. The dimensions of the bag are those appropriate to the amount of coffee to be brewed, and in practice small bags may be used to brew a single or two cups of coffee. It will be apparent that a whole range of bag sizes is feasible to make any desired quantity of coffee.

The envelope-shaped bag may be regarded as being formed by two superposed panels whose edges are sealed except at the top end or mouth. Attached to the top border of the two panels are a pair of deformable wires 12 and 13, which may be of metal or plastic material, whose length is greater than the width of the panels, whereby the wires extend laterally from the bag to provide extensions 12A and 13A and extensions 12B and 13B.

FIG. 1 shows the bag in its collapsed condition, and since it is a flat envelope, such bags may be readily stacked and stored in relatively little space. To make coffee, the wires 12 and 13 are bent into opposing bows, as shown in FIG. 2, to expand the envelope, thereby defining an open mouth. The end extensions of the wire are thereby caused to intersect to form V-shaped wings which are adapted to rest on the rim of a cup 14 or other suitable container whose size is appropriate to the dimensions of the filter bag. Thus the bag is now suspended within cup 14 in readiness for coffee making.

By way of example, we shall assume that the cup has an eight-ounce capacity and that the filter bag has almost the same capacity for making a single cup of coffee. Thus, to quickly brew one cup of coffee, a standard measure of coffee grounds is added to the bag, and boiling water is poured thereover. The resultant brew is stirred with a spoon and allowed to brew for no more than about a half-minute. As brewing takes place, some of the liquid begins to seep through the filter medium, the grounds however remaining in the bag. Preferably the coffee grounds are in finely pulverized form to obtain a quick brewing action.

The wires are then again deformed to close the bag, this being done simply by pulling on the lateral wire extensions. The bag is then raised above the cup, as shown in FIG. 3, and the ends of the wires are rotated to cause the body of the bag to wind about the wires, which serve as the core of a roll. When the bag is picked up, the weight of the water therein aids in causing the water to pass through the filter medium, and as the bag is rolled and the internal dimensions thereof are reduced, the water therein is subjected to pressure and forced through the pores of the filter medium.

The pressurized flow of water through the coffee grounds accelerates the extraction and homogenization of coffee essences therefrom, and in a matter of a few seconds, a full-bodied liquid coffee of high strength and quality fills the cup. Thus the total amount of time for this brewing operation is less than a minute.

Since the spent coffee grounds are contained in the sealed bag, the bag may readily be discarded and no clean-up operation is necessary after brewing the coffee in the manner described.

The actual amount of time it takes to brew a full-bodied cup of coffee depends on the fineness of the coffee, the porosity characteristics of the filter medium, as well as the rate at which pressure is applied. In practice, the total time can be reduced to as little as fifteen seconds, although a more leisurely one-minute or more is not objectionable. In any event, total brewing time is far shorter than any known filter technique, so that one is able to secure in coffee-making, the advantages of filtration without the usual concomitant disadvantages.

The high speed characteristics of the technique minimizes heat loss, so that the brewed coffee is very hot, which is often not the case with the much slower conventional filter techniques. It is also to be noted that the pressure may be obtained by means other than that shown. For example, instead of rolling the bag, a tool may be provided to wring or otherwise subject the bag contents to pressure. Or the cup may include a constriction ring encircling the bag, such that as the bag is pulled out of the cup, the ring acts to force the water through the filter paper. Filtration takes place throughout the entire body of the bag, not at the bottom, as in many prior techniques.

Referring now to FIG. 4, there is shown another embodiment of the invention wherein a filter bag 15 having a rigidified lip 16 is supported within an open wire basket 17 which in turn is telescoped within a cup 18. This is particularly useful for large-capacity coffee makers, the wire basket serving to support the bag. In operation, after boiling water is added and the brew is stirred, the bag is closed and the basket is lifted from the cup. The weight of the water then produces most of the necessary pressure, although additional pressure may be applied. Means may be provided to rest the basket at an elevated position in the cup or container while the water is seeping through the filter bag.

While there have been shown and described preferred embodiments of high-speed coffee brewer in accordance with the invention, it will be appreciated that many changes and modifications may be made therein without, however, departing from the essential spirit of the invention as defined in the annexed claims.

What I claim is:
1. A coffee maker capable of brewing coffee within a container without leaving a deposit of spent coffee grounds therein, said maker comprising:
 (a) an openable filter bag formed of liquid-permeable material for holding a measure of coffee grounds, said bag being dimensioned to be receivable within said container and having a wet strength sufficient to maintain the integrity of the bag when boiling water is poured therein over the grounds to effect a brewing action,
 (b) means to close the bag to envelop the boiling water, and
 (c) means to thereafter subject the closed bag to pressure to express the enveloped boiling water through the grounds and substantially the entire body of the filter material into said container to fill said container with liquid coffee.
2. A coffee maker as set forth in claim 1, whereby said bag is made of high wet-strength filter paper.
3. A coffee maker as set forth in claim 1, wherein the mouth of the bag has deformable wires attached thereto which facilitate opening and closing of the bag.
4. A coffee maker as set forth in claim 3, wherein said wires have lateral extensions which are restable on the rim of the container to suspend the bag therein.
5. A coffee maker as set forth in claim 1, wherein said bag is constituted by a flat envelope which may be readily stacked and stored, and which when expanded is adapted to receive said coffee grounds and water.
6. A coffee maker as set forth in claim 1, further including an open-mesh basket for supporting said bag within the container.
7. A coffee maker as set forth in claim 6, further including means to maintain said basket within said wire container at an elevated position therein.

References Cited

UNITED STATES PATENTS

| | | | |
|---|---|---|---|
| 1,281,984 | 10/1918 | Long | 99—287 |
| 1,440,047 | 12/1922 | Aborn | 99—304 |
| 1,462,610 | 7/1923 | Meyer | 99—304 |
| 2,285,113 | 6/1942 | Eaton | 99—287 |
| 2,805,164 | 9/1957 | Doppler | 99—77.1 |

ROBERT W. JENKINS, *Primary Examiner.*